United States Patent
Kerschbaum et al.

(10) Patent No.: US 7,360,443 B2
(45) Date of Patent: Apr. 22, 2008

(54) TEST BENCH AND METHOD FOR CARRYING OUT AERODYNAMIC MEASUREMENTS ON VEHICLES

(75) Inventors: Hans Kerschbaum, Pastetten (DE); Ulrich Tacke, Munich (DE); Welf Ebeling, Munich (DE); Karlheinz Ebbinghaus, Munich (DE); Bradley Litz, Chaska, MN (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 123 days.

(21) Appl. No.: 11/358,038

(22) Filed: Feb. 22, 2006

(65) Prior Publication Data

US 2006/0237237 A1    Oct. 26, 2006

Related U.S. Application Data

(63) Continuation of application No. PCT/EP2004/009014, filed on Aug. 12, 2004.

(30) Foreign Application Priority Data

Aug. 22, 2003   (DE) ................. 103 38 638

(51) Int. Cl.
    *G01N 3/02*    (2006.01)
(52) U.S. Cl. ........................................ 73/856
(58) Field of Classification Search ........... 73/856, 73/118.1, 128
    See application file for complete search history.

(56) References Cited

U.S. PATENT DOCUMENTS

| | | | |
|---|---|---|---|
| 4,843,873 A | | 7/1989 | Harald et al. |
| 4,942,762 A | * | 7/1990 | Schober et al. ............... 73/117 |
| 4,953,391 A | * | 9/1990 | Schober et al. ............... 73/117 |
| 5,337,600 A | * | 8/1994 | Kaneko et al. ............... 73/117 |
| 5,942,673 A | * | 8/1999 | Horiuchi et al. ............. 73/11.04 |
| 6,237,504 B1 | * | 5/2001 | Tanahashi et al. ............ 104/243 |
| 6,247,348 B1 | * | 6/2001 | Yamakado et al. ........... 73/11.04 |
| 6,427,528 B1 | * | 8/2002 | Yamakado et al. ............ 73/121 |

FOREIGN PATENT DOCUMENTS

DE    37 15 460 C    10/1988

(Continued)

OTHER PUBLICATIONS

German Search Report, Jan. 23, 2004.

(Continued)

*Primary Examiner*—Max Noori
(74) *Attorney, Agent, or Firm*—Crowell & Moring LLP

(57) ABSTRACT

A test bench for carrying out aerodynamic measurements on vehicles is equipped with at least one contact surface for detecting the vehicle weight, a running belt for simulating the roadway moving under the vehicle, and at least one measuring device for determining forces acting upon the vehicle. According to the invention, the moving belt for simulating the roadway also forms the at least one contact surface for detecting the vehicle weight, and the running belt is in its entirety supported by a weighing plate, which is disposed via a bearing device relative to a stationary environment. At least one measuring device determines the forces acting upon the vehicle as a function of the movement of the weighing plate relative to the stationary environment.

18 Claims, 1 Drawing Sheet

FOREIGN PATENT DOCUMENTS

| | | |
|---|---|---|
| DE | 3 830 048 C1 | 12/1989 |
| DE | 3 941 685 C2 | 6/1991 |
| DE | 4 240 128 C1 | 5/1994 |
| DE | 195 27 742 A | 1/1997 |
| DE | 19 702 421 C2 | 8/1998 |
| EP | 01 68 527 B1 | 1/1986 |
| EP | 016 8508 A1 | 1/1986 |
| EP | 0 393 505 A | 10/1990 |
| EP | 050 4437 B1 | 9/1992 |
| GB | 273 742 A | 11/1927 |
| WO | WO 91/09291 A1 | 6/1991 |

OTHER PUBLICATIONS

International Search Report, Nov. 18, 2004.

* cited by examiner

TEST BENCH AND METHOD FOR CARRYING OUT AERODYNAMIC MEASUREMENTS ON VEHICLES

CROSS-REFERENCE TO RELATED APPLICATIONS

This application is a continuation of PCT Application No. PCT/EP2004/009014 filed on Aug. 12, 2004, which claims priority to German Application No. 103 38 638.6 filed on Aug. 22, 2003, the entire disclosure of which is incorporated herein by reference.

BACKGROUND AND SUMMARY OF THE INVENTION

The invention relates to a test bench for carrying out aerodynamic measurements on vehicles. The test bench has at least one contact surface for detecting the weight of the vehicle, a running belt for simulating the roadway moving under the vehicle, and at least one measuring device for determining the forces acting upon the vehicle. The invention also relates to an aerodynamic measuring method for vehicles comprising the steps of detecting the vehicle weight on at least one contact surface, simulating the roadway moving under the vehicle using a running belt, and determining forces acting upon the vehicle.

Test benches of the above-mentioned type are used in the vehicle industry, particularly in the case of series-produced vehicles and racing sports vehicles, for measuring aerodynamic drag forces in a wind tunnel.

In the case of such test benches, so-called single-belt systems are known which have external force-detecting devices for measuring forces parallel to the roadway plane in a vehicle fixing system, particularly laterally beside a road wheel of the vehicle. For measuring lift forces, several load cells are integrated at the road wheels in a running belt table, and the load cells measure the wheel load through the running belt. Furthermore, so-called five-belt systems are known which have four wheel running belts integrated in a wind tunnel with one running belt arranged there-between for simulating the moving roadway.

In the case of the known single-belt systems, the aerodynamic drag forces are determined together with high rolling friction forces by the external measuring and fixing devices. However, rolling friction forces can be determined only with limited precision using calibration measurements. Under certain circumstances, aerodynamic side forces are determined incorrectly because they are partially transmitted to the running belt and the force values at the measuring and fixing devices are thereby reduced. On the whole, the single-belt systems have weaknesses with respect to the reproducibility of the aerodynamic longitudinal and side forces and result in considerable testing expenditures in order to statistically confirm the test results.

Known five-belt systems simulate the roadway moving under the vehicle by a comparatively narrow center running belt and the four wheel running belts. Flow disturbances arise in the case of this simulation technique at the running belt edges of the center running belt, which results in a partial disturbance of the flow of air into the wheel area of the vehicle measured. The weaknesses of the five-belt system during the roadway simulation can, as a rule, still be tolerated in the case of series-produced vehicles, which typically have a large clearance above the road surface and wheels integrated in the vehicle body. However, in the case of racing sports vehicles with a small road clearance, simulation errors may lead to insufficient results.

It is an object of the invention to provide a test bench and a method for carrying out aerodynamic measurements on vehicles by which the above-mentioned disadvantages are overcome and the roadway moving under the vehicle can be correctly simulated in a comparatively cost-effective and easily implementable manner.

According to the invention, this object is achieved by use of a test bench, wherein the running belt for simulating the roadway simultaneously creates at least one contact surface for detecting the vehicle weight. The running belt is arranged on a weighing plate, which is disposed on a bearing device relative to a stationary environment, and at least one measuring device determines the forces acting upon the vehicle based on the movement of the weighing plate relative to the stationary environment. This object is also achieved by an aerodynamic measuring method comprising the steps of constructing the at least one contact surface with the running belt for simulating the roadway moved under the vehicle, supporting the entire running belt on a weighing plate disposed relative to a stationary environment, and determining forces acting upon the vehicle using the movement of the weighing plate relative to the stationary environment.

In the case of the test bench according to the invention, a comparatively large running belt is mounted on a weighing plate and, as a whole, is movably disposed with respect to a stationary environment. The movable weighing plate is coupled with at least one measuring device through which the forces which occur between the weighing plate and the stationary environment during a test can be measured. The forces determined in this manner correspond to the aerodynamic drag forces on the vehicle during the test.

In comparison to a single-belt system, according to the invention, interfering rolling friction forces are compensated by the running belt and the running belt drive because the running belt is supported on or integrated with a weighing plate. Aerodynamic longitudinal and side forces are transmitted from the vehicle by way of the running belt to the weighing plate. According to the invention, the forces can easily be determined relative to the stationary environment of the weighing plate.

Interfering air friction forces on the running belt surface do not occur according to the invention because only one running belt is used and, as a result, all flow edges between running belts are avoided. Furthermore, air friction forces on the running belt surface can be excluded from the force measurement in that the same running belt speed and air speed are selected.

According to the invention, the aerodynamic forces resulting from a mounting device can likewise be omitted by using a brace such as thin cables or bracing rods whereby the aerodynamic forces can be determined by force measurements under wind pressure without the vehicle.

The invention advantageously combines the comparatively realistic simulation of the single-belt system with the reproducibility of aerodynamic forces found in a five-belt system.

As an advantageous further development of the test bench according to the invention for aerodynamic measurements, using the bearing device, the weighing plate can be displaced relative to the stationary environment, preferably in a floating manner. As an alternative, or in addition to a displacing movement, the weighing plate with its running belt arranged thereon or therein can advantageously be set or suspended on swivelable supports. The bearing device is adapted to provide an essentially frictionless movement of the weighing plate relative to the stationary environment.

For such a low-friction movement, the bearing device of the weighing plate may be designed in a cost-effective manner with at least one hydrostatic bearing.

According to a preferred embodiment, a bearing device of the weighing plate comprises a piezoelectric force transducer that may simultaneously function as a measuring device for determining forces on the weighing plate relative to the stationary environment.

The at least one measuring device for determining forces acting upon the vehicle is advantageously constructed with at least one load weighing cell for determining forces at the weighing plate parallel to the roadway plane. The aerodynamic longitudinal and side forces acting upon a vehicle can be determined by three such weighing cells whereby one of the cells determines the force of the movement of the weighing plate in the driving direction, and two additional cells each determine the forces of the weighing plate transversely to the driving direction.

Using the test bench according to the invention, aerodynamic lift forces can be determined on the vehicle to be measured. For the measuring of the lift forces, at least one weighing cell is provided by which forces can be determined in the direction of the vertical axis of the vehicle at the at least one contact surface between the vehicle and the weighing plate. According to the invention, the vehicle to be measured is advantageously fixed on the test bench by at least one fixing device on the running belt. The fixing device transmits the aerodynamic longitudinal and side forces to the weighing plate, where they can be measured by the above-mentioned weighing cells relative to the stationary environment. Furthermore, using the fixing device, the running belt is protected from slipping off-center and moving down.

BRIEF DESCRIPTION OF THE DRAWINGS

An embodiment of the present invention is described in greater detail on the basis of the drawings, in which.

DETAILED DESCRIPTION OF THE DRAWINGS

Figures 1, 2:
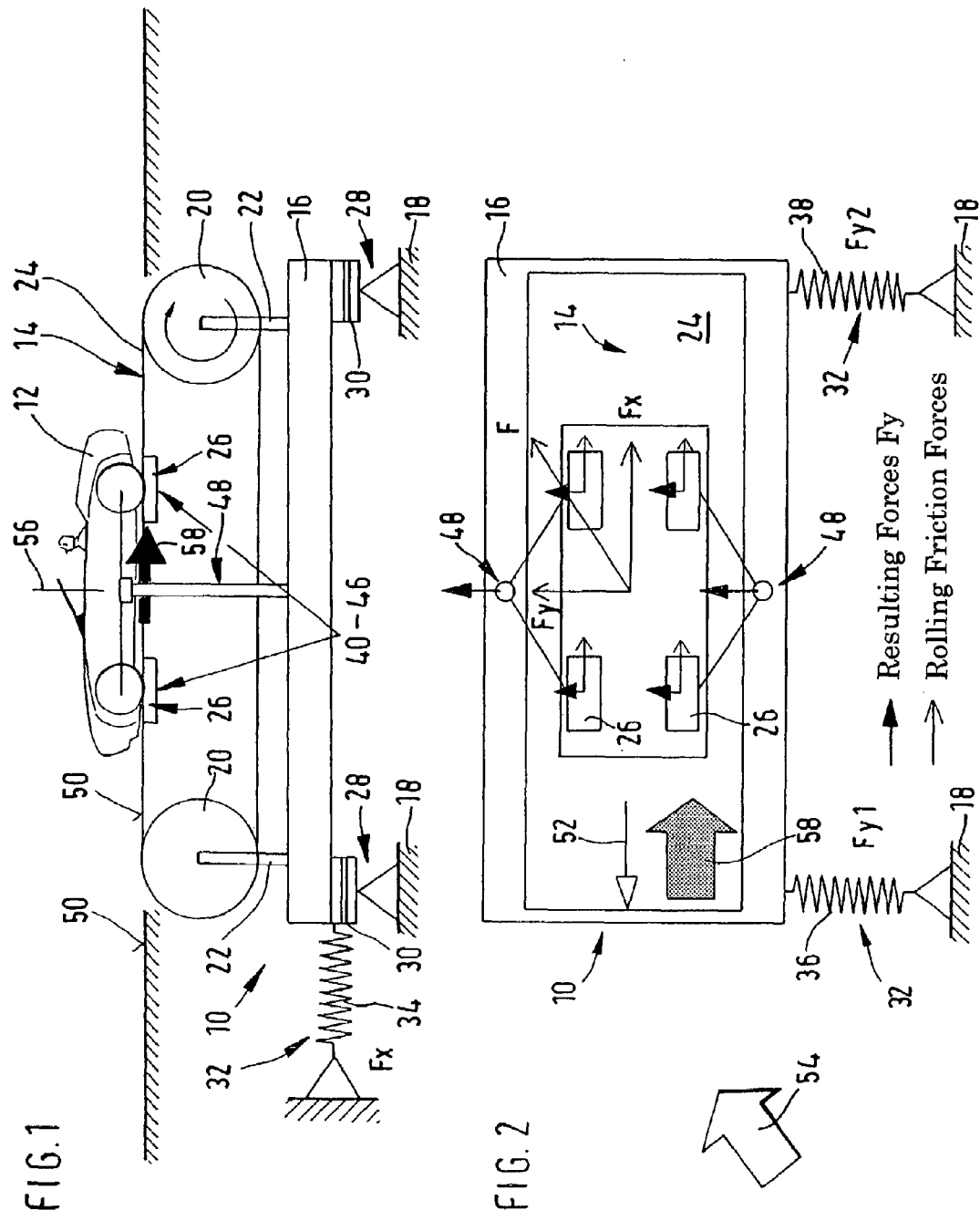
FIG. 1 is a simplified lateral view of an embodiment of a test bench for aerodynamic measurements.
FIG. 2 is a simplified top view of the test bench shown in FIG. 1.

FIGS. 1 and 2 illustrate a test bench 10 for aerodynamic measurements on a vehicle 12 which comprises a running belt 14 and a weighing plate 16 situated underneath the running belt. The weighing plate 16 is supported relative to a stationary environment 18.

The running belt 14 is supported by two rollers 20 which extend parallel to one another and are supported on roller supports 22 attached to the weighing plate 16. The rollers 20 are surrounded by a belt 24 by which a total of four contact surfaces 26 are formed for supporting the vehicle 12 placed on the running belt 14.

The weighing plate 16 is essentially rectangular and, at its corner areas, is supported by four bearing devices 28 attached to the stationary environment 18. The bearing devices 28 are designed with hydrostatic bearings 30 (e.g., floating plates) which permit an almost frictionless displacement of the weighing plate 16 relative to the stationary environment 18.

Several measuring devices 32 for determining the aerodynamic forces acting upon the vehicle 12 during a test are arranged on the test bench 10. The measuring devices 32 comprise a total of seven weighing cells 34 to 46.

As mentioned above, vehicle 12 to be measured is placed on the test bench 10 on the contact surfaces 26 of the running belt 14. Using a fixing device 48, the vehicle 12 placed in this manner is fastened on a simulated roadway plane 50.

Under the vehicle 12, the rollers 20 can cause the belt 24 to revolve so that a driving direction 52 is simulated for the vehicle 12. By using a wind tunnel, which is not shown, wind (see wind direction arrow 54 in FIG. 2) can be simulated and applied to the vehicle 12 arranged on the test bench 10. The longitudinal and side forces (Fx and Fy), moments, and lift forces (Fz) acting at the vehicle by the applied wind can be determined during a test by the measuring devices 32 arranged according to the invention. In FIG. 2, the side forces (Fy) are depicted using bold-headed arrows.

In order to simulate the roadway moving relative to the vehicle 12 in a cost-effective manner, and achieve a high-precision measurement of drag forces, side forces and lift forces without any interfering rolling friction forces, a total of seven weighing cells 34 to 46 are provided on the weighing plate 16 with the single running belt 14 arranged thereon. Of these weighing cells, a first weighing cell 34 is constructed for measuring forces Fx between the weighing plate 16 and the stationary environment in the driving direction 52. Two additional weighing cells 36 and 38 are provided for measuring forces Fy between the weighing plate 16 and the stationary environment 18 transversely to the driving direction 52.

By arranging the weighing cells 34 to 38 in this manner, only the wind forces or moments acting upon the vehicle 12 are determined, while the rolling friction forces of the vehicle 12 on the belt 24 are diverted by way of the fixing device 48 to the weighing plate 16 and do not enter into the measurement of the aerodynamic forces and moments.

The lift forces Fz acting upon the vehicle 12, which are largely caused by the air stream, are determined by the above-mentioned total of four weighing cells 40 to 46, which are arranged at the wheels of the vehicle 12 under the belt 24 at the individual contact surfaces 26. The weighing cells 40 to 46 determine forces between the running belt 14 and the vehicle 12 in the parallel direction with respect to the vertical axis 56 of the vehicle 12. As an alternative, or in addition to the four weighing cells 40 to 46 for measuring forces Fz in the essentially vertical direction, a single weighing cell can be arranged at the fixing device 48 or at two fixing devices 48 which are arranged on both sides of the vehicle 12, in order to determine forces parallel to the vertical axis 56 of the vehicle 12 between the vehicle 12 and the weighing plate 16.

While the top side of the belt 24 moves in a direction 58 (opposite to the driving direction 52), the rolling friction forces act at the wheels of the vehicle 12. These rolling friction forces are compensated by the drive of the belt 24 or by the rollers 20. In FIG. 2, the rolling friction forces are depicted using open-headed arrows.

Furthermore, wind force F according to the wind direction arrow 54 acts upon the vehicle 12 during a test. This wind force F can be divided into the two force components of longitudinal force Fx and side force Fy. The wind force components Fx and Fy result in a supporting force of the vehicle on the fixing device 48. The forces are transmitted by way of the fixing device 48 to the weighing plate 16 and, from there, to the weighing cells 34 to 38 to determine forces Fx, Fy1 and Fy2. In this manner, the aerodynamic longitudinal and side forces on the vehicle 12 are measured.

As a result of the wind force F, lift forces also act upon the vehicle 12. These lift forces are determined by weighing cells 40 to 46, which are positioned directly under the wheels of the vehicle 12.

LIST OF REFERENCE NUMBERS

10 test bench
12 vehicle
14 running belt
16 weighing plate
18 stationary environment
20 roller
22 roller support
24 belt
26 contact surface
28 bearing device
30 hydrostatic bearing
32 measuring device
34 first weighing cell Fx
36 second weighing cell Fy1
38 third weighing cell Fy2
40 fourth weighing cell Fz1
42 fifth weighing cell Fz2
44 sixth weighing cell Fz3
46 seventh weighing cell Fz4
48 fixing device
50 roadway plane
52 driving direction
54 wind direction
56 vertical axis
58 moving direction of the top side of the belt While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

What is claimed is:

1. A test bench for carrying out aerodynamic measurements on vehicles comprising:
    at least one contact surface for detecting a weight of a vehicle;
    a running belt for simulating a roadway moving under the vehicle; and
    at least one measuring device for measuring forces acting upon the vehicle, wherein
    the at least one contact surface is formed on the running belt;
    the running belt is arranged on a weighing plate which is disposed on a bearing device relative to a stationary environment; and
    the at least one measuring device can measure forces acting upon the vehicle via movement of the weighing plate relative to the stationary environment.

2. The test bench according to claim 1, wherein the weighing plate is displaceably disposed relative to the stationary environment.

3. The test bench according to claim 1, wherein the weighing plate is adapted to float with respect to the stationary environment.

4. The test bench according to claim 1, wherein the bearing device comprises at least one hydrostatic bearing.

5. The test bench according to claim 1, wherein the bearing device comprises at least one piezoelectric force transducer which is adapted to measure forces acting upon the weighing plate relative to the stationary environment.

6. The test bench according to claim 1, wherein the at least one measuring device comprises at least one weighing cell for determining forces parallel to a driving direction of the vehicle and/or forces transverse to a driving direction of the vehicle.

7. The test bench according to claim 1, wherein the at least one measuring device comprises at least one weighing cell for determining forces in a direction of a vertical axis of the vehicle.

8. The test bench according to claim 7, wherein the at least one weighing cell measures forces at the at least one contact surface.

9. The test bench according to claim 7, wherein the at least one weighing cell measures forces relative to the weighing plate.

10. The test bench according to claim 1, comprising at least one fixing device adapted to fix the vehicle relative to the weighing plate.

11. A method for carrying out aerodynamic measurements on vehicles, the method comprising the acts of:
    measuring a vehicle weight at at least one contact surface formed on a running belt that is supported in its entirety by a weighing plate that is supported relative to a stationary environment via a bearing device;
    simulating roadway movement under the vehicle using the running belt; and
    determining forces acting upon the vehicle by measuring movement of the weighing plate relative to the stationary environment.

12. The method according to claim 11, wherein the weighing plate is displaceably disposed relative to the stationary environment.

13. The method according to claim 11, wherein the weighing plate is adapted to float with respect to the stationary environment.

14. The method according to claim 11, wherein the forces include at least one force parallel to a driving direction of the vehicle and/or at least two forces transverse to a driving direction of the vehicle.

15. The method according to claim 11, wherein the forces include at least one force in a direction of a vertical axis of the vehicle.

16. The method according to claim 15, wherein the forces are measured at the at least one contact surface.

17. The method according to claim 15, wherein the forces are measured relative to the weighing plate.

18. The method according to claim 11, further comprising the act of fixing the vehicle relative to the weighing plate.

* * * * *